(12) United States Patent
Crutcher

(10) Patent No.: US 9,257,760 B2
(45) Date of Patent: Feb. 9, 2016

(54) STRANDED COMPOSITE CORE COMPRESSION CONNECTOR ASSEMBLY

(71) Applicant: Hubbell Incorporated, Shelton, CT (US)

(72) Inventor: Bernard Chenault Crutcher, Londonderry, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 49 days.

(21) Appl. No.: 13/803,664

(22) Filed: Mar. 14, 2013

(65) Prior Publication Data

US 2014/0273670 A1    Sep. 18, 2014

(51) Int. Cl.
*H02G 15/02*    (2006.01)
*H02G 15/08*    (2006.01)
*H01R 4/50*    (2006.01)

(52) U.S. Cl.
CPC .................................. *H01R 4/5025* (2013.01)

(58) Field of Classification Search
CPC ........ H01R 11/12; H01R 4/5025; H01R 4/62; H02G 7/056
USPC .......... 174/84 R, 88 R, 90, 92; 439/863, 877, 439/879
See application file for complete search history.

(56) References Cited

U.S. PATENT DOCUMENTS

| | | | |
|---|---|---|---|
| 2,995,615 A | 8/1961 | Gibbon et al. | |
| 3,613,179 A | 10/1971 | Whittaker | |
| 4,453,034 A * | 6/1984 | Annas et al. | 174/79 |
| 4,614,399 A * | 9/1986 | Gemra et al. | 439/404 |
| 5,879,285 A * | 3/1999 | Ishii | 600/110 |
| 6,015,953 A | 1/2000 | Tosaka et al. | |
| 6,285,910 B1 | 9/2001 | Verness et al. | |
| 6,471,417 B1 * | 10/2002 | Wang et al. | 385/72 |
| 6,528,728 B1 | 3/2003 | Shima | |
| 6,548,761 B1 * | 4/2003 | Wang | 174/74 R |
| 6,748,708 B1 | 6/2004 | Fuzier et al. | |
| 7,385,138 B2 | 6/2008 | De France et al. | |
| 2001/0023777 A1 * | 9/2001 | Lee et al. | 174/97 |
| 2002/0038718 A1 | 4/2002 | Gianfranchi | |
| 2005/0006129 A1 * | 1/2005 | Bryant | 174/88 R |
| 2005/0227067 A1 * | 10/2005 | Hiel et al. | 428/364 |
| 2007/0066153 A1 * | 3/2007 | De France et al. | 439/877 |
| 2007/0202740 A1 | 8/2007 | Byrne et al. | |
| 2007/0287323 A1 * | 12/2007 | Colescott et al. | 439/421 |
| 2008/0233787 A1 | 9/2008 | Geibel et al. | |
| 2012/0181082 A1 | 7/2012 | Faulkner et al. | |
| 2013/0045645 A1 | 2/2013 | De France et al. | |
| 2013/0192870 A1 | 8/2013 | Wang et al. | |

FOREIGN PATENT DOCUMENTS

EP    0076365    4/1983

* cited by examiner

*Primary Examiner* — Yuriy Semenenko
(74) *Attorney, Agent, or Firm* — Dickinson Wright PLLC

(57) ABSTRACT

A coupling member for receiving wire strands of a stranded composite core conductor includes a substantially cylindrical body having first and second ends. A first through hole extends from a first opening at the first end to a second opening at the second end of the body for receiving a wire strand of the stranded conductor. A first protrusion extends axially outwardly from the first end of the body. A first recess in the second end of the body is adapted to receive a protrusion of an adjacent coupling member.

21 Claims, 8 Drawing Sheets

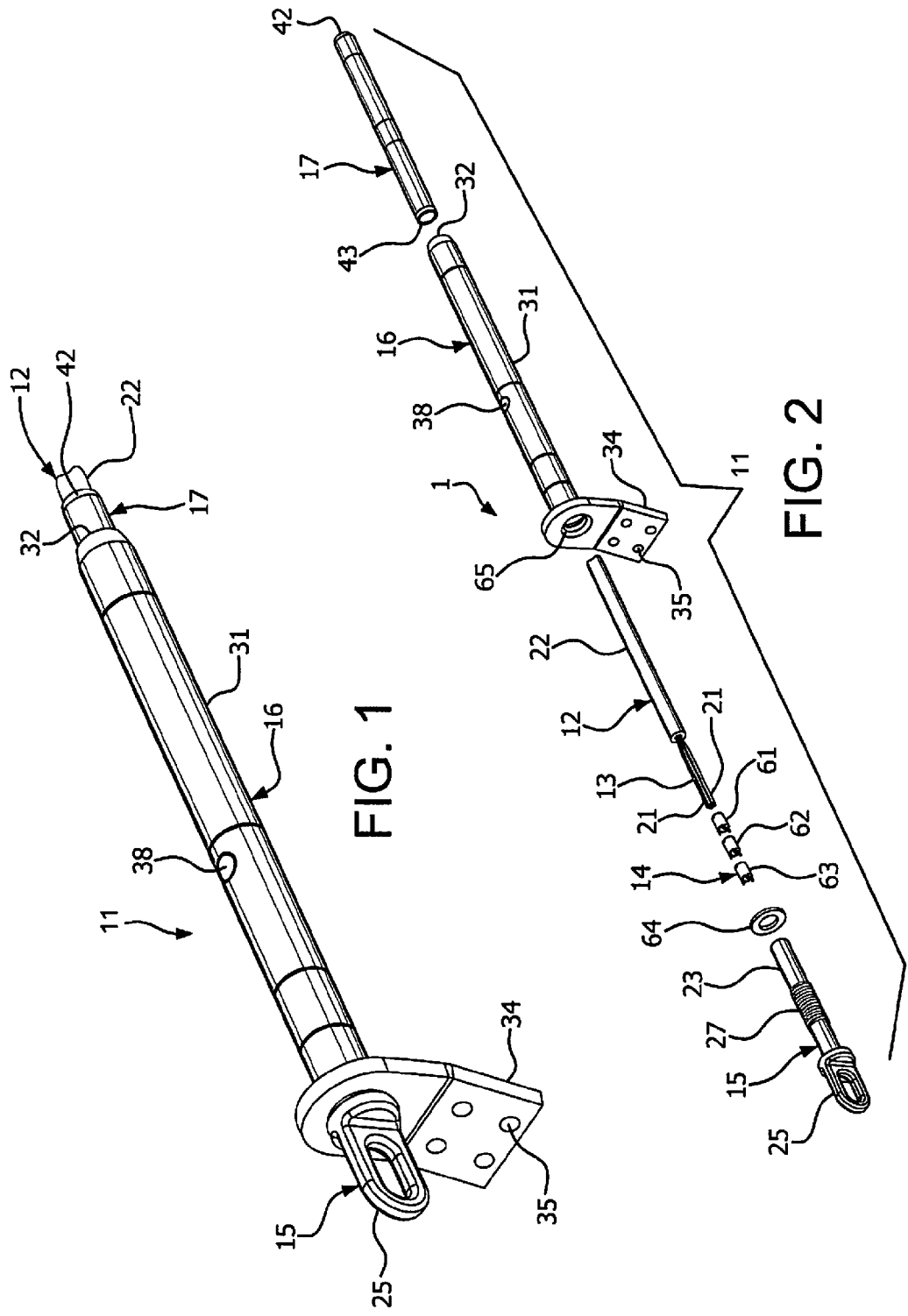

STRANDED COMPOSITE CORE COMPRESSION CONNECTOR ASSEMBLY

FIELD OF THE INVENTION

The present invention relates generally to a composite core compression connector assembly for stranded cable. More particularly, the present invention relates to a compression connector having a coupling member having a plurality of through holes to receive strands of a stranded cable. Still more particularly, the present invention relates to a connector assembly for stranded cable in which a coupling member has axially extending protrusions at one end and corresponding recesses at the other end to facilitate connecting coupling members together.

BACKGROUND OF THE INVENTION

The vast majority of high voltage transmission conductors used includes strands of high strength steel surrounded by multiple strands of aluminum wire. The steel strands are the principle load bearing component holding up the wire, while the softer, more elastic aluminum strands include the majority of the electrical power transport component. Many variations of transmission wire operating at between approximately 115 kv to 800 kV revolve around this basic design concept, but all have these two basic components.

More recently, a single carbon fiber based pultruded composite core with an epoxy and/or fiberglass protective coating has emerged as a substitute for the steel support stranding in high voltage transmission conductors. Its attraction stems from three comparative broad areas. First, the carbon fiber based pultruded composite core has a proportionally higher tensile strength than commonly used high strength steel. Second, there is substantially less physical expansion/contraction properties when subjected to temperature changes than steel. Third, there is a higher tensile strength to weight ratio than steel resulting in a smaller overall diameter with higher strength.

The single carbon fiber based pultruded composite core results in an equal or greater tensile strength that can be achieved with a smaller overall diameter of carbon based pultruded rod than its high strength steel counterpart. Additional aluminum strands can then be added to the conductor, allowing more electrical load to be carried on the line. Because the carbon composite core has a dramatically lower coefficient of expansion than steel under high current load and/or high temperatures, the composite strands will not cause the conductor to "sag" (droop) between towers. When existing steel high voltage transmission lines sag, contact with the ground foliage can occur resulting in outages.

Carbon based, or "composite core conductor" as it is commonly referred to, is a viable alternative in re-conductor applications where existing capacity can be increased by replacing existing transmission conductors with steel wires with new composite based ones. Exemplary composite core conductors are disclosed in U.S. Pat. Nos. 7,041,909, 7,179,522 and 7,368,162 to Hiel et al., each of which is hereby incorporated by reference in its entirety.

Existing composite core conductors have a single pultruded core with a coating thereon serving as the sole structural support for the conductor. Single core design composite supported conductors may be at a higher risk of failure if a portion of the core is damaged accidently or intentionally. It is not uncommon to have rifle bullets from hunters either accidentally or intentionally strike and damage conductors. Damaging a portion of the single unitized composite core design can put the entire composite core rod structure at risk under a tensile load. Multiple stranded supported transmission conductors have a much higher reliability and survivability than single strand supported conductors of comparable tensile strength. Higher safety and reliability margins in tensile requirements can be achieved economically by adding strands to the design.

Accordingly, a need exists for a smaller diameter carbon based conductor support structure that is bundled together to replace the single unitized core conductor. Multiple stranding reduces the probability of total failure should one or more of the multiple strands become damaged. The integrity of the remaining strands with full tensile capability provides a higher probability of remaining intact and preventing the transmission wire from separating and falling to the ground.

SUMMARY OF THE INVENTION

An object of the present invention is to provide an improved compression connector assembly for terminating wire strands of a multiple stranded composite core conductor.

Another object of the present invention is to provide an improved coupling member for a compression connector assembly having a plurality of through holes to receive strands of a multiple stranded composite cord conductor.

Another object of the present invention is to provide an improved coupling member having axially extending protrusions at one end and corresponding recesses at the other end to facilitate connecting (ganging) coupling members together.

Yet another object of the present invention is to provide an improved coupling member in which strands of a multiple stranded composite core conductor are separated from one another to prevent failure of the conductor when a strand is damaged.

The foregoing objects are basically attained by a coupling member for receiving wire strands of a stranded composite core conductor. The coupling member includes a substantially cylindrical body having first and second ends. A first through-hole extends from a first opening at the first end to a second opening at the second end of the body for receiving a wire strand of the stranded conductor. A first protrusion extends axially outwardly from the first end of the body. A first recess in the second end of the body is adapted to receive a protrusion of an adjacent coupling member.

The foregoing objects are also basically attained by a compression connector assembly for terminating wire strands of a stranded composite core conductor including a first coupling member having a first through-hole extending from a first end to a second end for receiving a strand of the stranded conductor. A first protrusion extends axially outwardly from the first end and a first recess in the second end of the body is adapted to receive a protrusion of an adjacent coupling member. A connector member has a cavity at a first end thereof for receiving the first coupling member. An outer housing has a passageway extending from a first end to a second end to receive the connector member.

The foregoing objects are also basically attained by a method of terminating a stranded composite core conductor. Each strand of the stranded composite core conductor is passed through a separate through hole of a first coupling member. The first coupling member is inserted in a cavity in a connecting member. The connecting member is inserted in an outer housing. The first coupling member, the connecting member and the outer housing are compressed to secure the received strands therein.

Objects, advantages, and salient features of the invention will become apparent from the following detailed description, which, taken in conjunction with the annexed drawings, discloses an exemplary embodiment of the present invention.

As used in this application, the terms "front," "rear," "upper," "lower," "upwardly," "downwardly," and other orientational descriptors are intended to facilitate the description of the exemplary embodiments of the present invention, and are not intended to limit the structure thereof to any particular position or orientation.

BRIEF DESCRIPTION OF THE DRAWINGS

The above benefits and other advantages of the various embodiments of the present invention will be more apparent from the following detailed description of exemplary embodiments of the present invention and from the accompanying drawing figures, in which:

FIG. 1 is a perspective view of a connector assembly in accordance with an exemplary embodiment of the present invention;

FIG. 2 is an exploded perspective view of the connector assembly of FIG. 1 in which coupling members are spaced;

Throughout the drawings, like reference numerals will be understood to refer to like parts, components and structures.

DETAILED DESCRIPTION OF EXEMPLARY EMBODIMENTS

Figure 3:
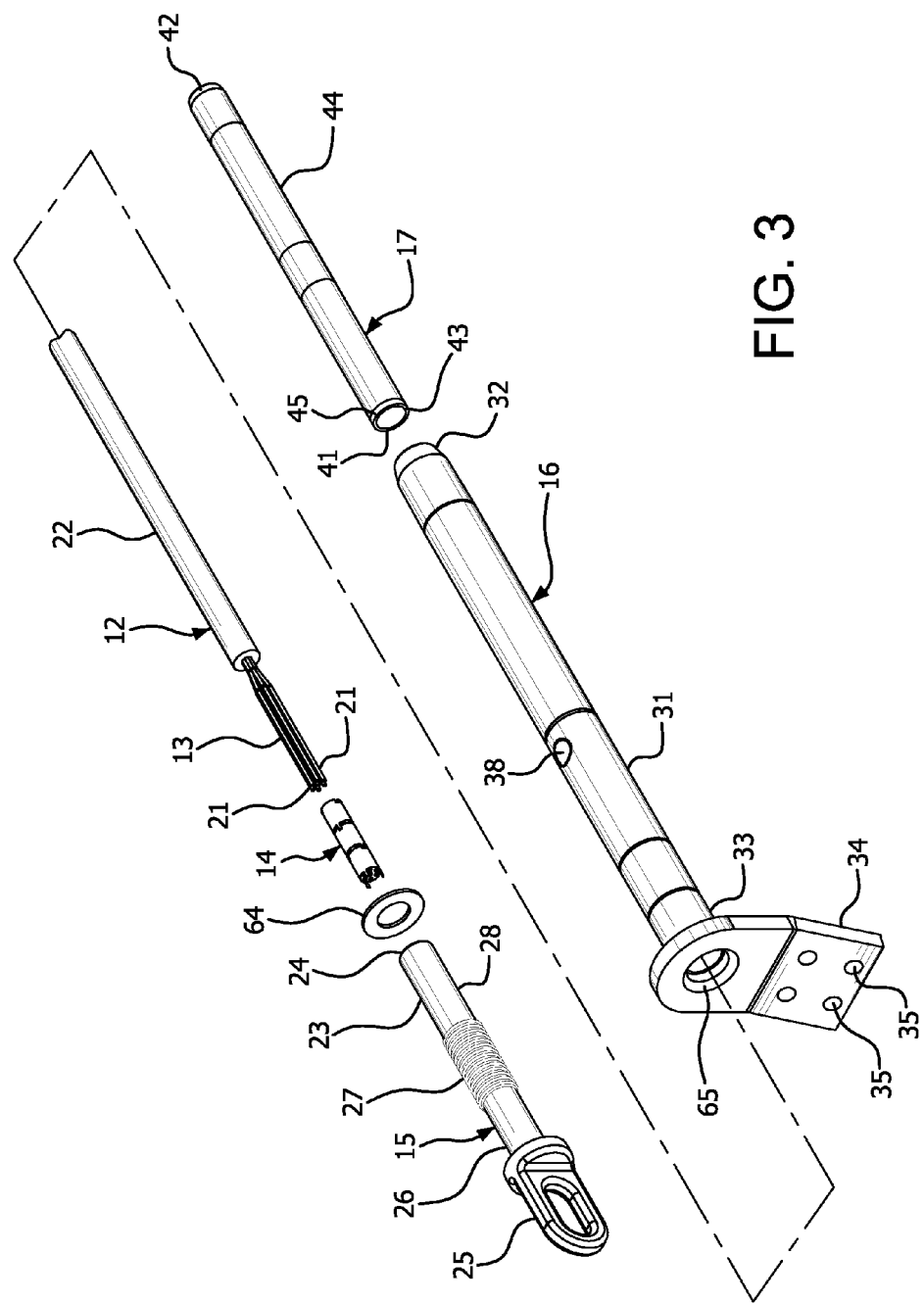
FIG. 3 is an enlarged and exploded perspective view of the connector assembly of FIG. 1 in which coupling members are stacked.
Figure 4:
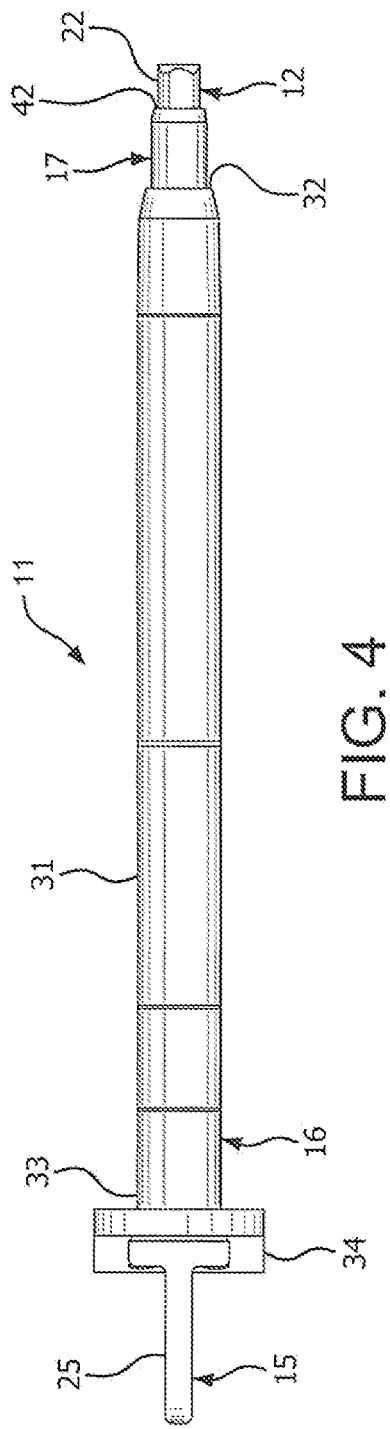
FIG. 4 is a top plan view of the connector assembly of FIG. 1.
Figure 5:
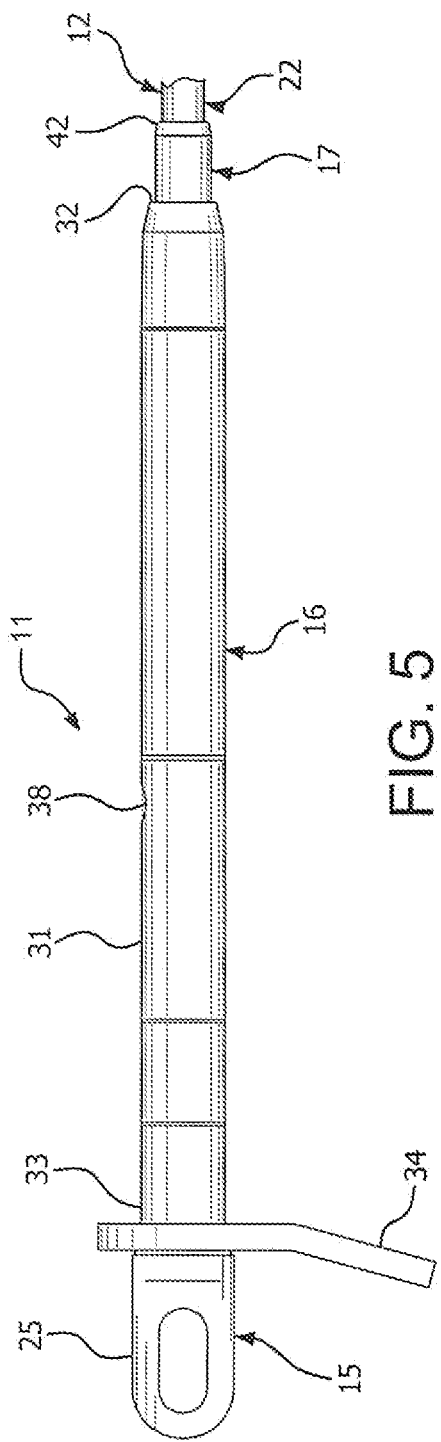
FIG. 5 is a side elevational view of the connector assembly of FIG. 1.

The present invention generally relates to a composite core compression connector assembly 11 for stranded cable, as shown in FIGS. 1-9. The connector assembly 11 connects high voltage aluminum conductors 12 having multiple stranded composite core reinforced cable 13. The connector assembly 11 facilitates connecting multiple pultruded carbon based composite core strands 13 into at least one coupling member 14. Compression can be in any form including hydraulic, implosive or mechanical.

In accordance with a first exemplary embodiment of the present invention, an electrical compression connector assembly 11 includes a connector member 15, an outer housing 16 and at least one coupling member 14 for receiving wire strands 21 of the stranded composite core 13 of the conductor 12. Each wire strand 21 is received in a separate through hole in the coupling member 14. A cavity 30 in the connector member 15 receives the coupling member 14. The compression connector assembly 11 can include an inner housing 17 to receive an outer core 22 of the conductor 12 and that is disposable in the outer housing 16 adjacent the connector member 15.

The conductor 12 is preferably a stranded core composite conductor. The core 13 of the conductor 12 includes a plurality of wire strands 21. Preferably, the core 13 includes seven carbon steel wire strands 21 in which a central wire strand is surrounded by six outer strands. The wire strands 21 of the core 13 are surrounded by an outer core 22 including a plurality of wire strands. Preferably, the outer core 22 is a plurality of aluminum wire strands.

Figure 7:
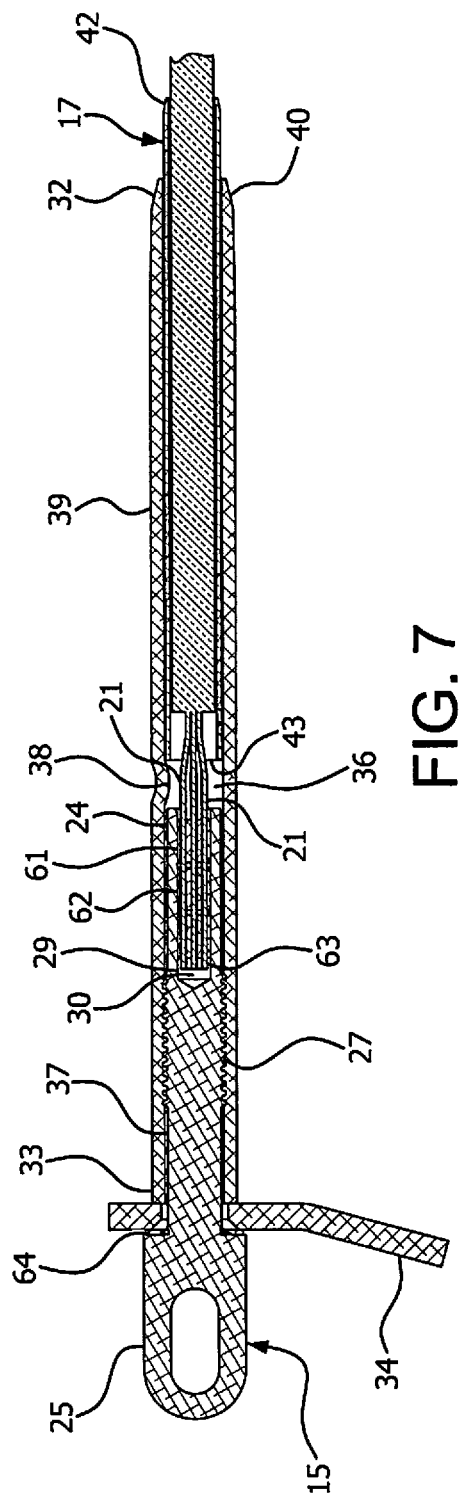
FIG. 7 is a side elevational view in cross section of the connector assembly taken along line 7-7 of FIG. 6.

The connector member 15 has a substantially tubular portion 23 having an open first end 24 and an eyelet 25 connected to a second end 26, as shown in FIG. 3. The eyelet 25 allows the connector assembly 1 to be connected to a support, such as a transmission tower. A ridge section 27 is disposed on an outer surface 28 of the tubular portion 23 between the first and second ends 24 and 26. A cavity 30 having an inner surface 29 extends inwardly from the first end 24 of the connector member 15, as shown in FIG. 7. Preferably, the connector member 15 is unitarily formed as a single piece and is made of metal, such as steel or aluminum.

The outer housing 16 has a substantially tubular portion 31 having first and second ends 32 and 33, as shown in FIGS. 1-3. A mounting plate 34 is connected to the second end 33 of the outer housing 16 to allow an electrical member, such as a cable assembly, to be electrically and mechanically connected thereto. A plurality of fastener holes 35 are disposed in the mounting plate 34 to facilitate connecting thereto. A passageway 36 having an inner surface 37 extends from the first end 32 of the outer housing 16 to an opening 65 in the mounting plate 34, as shown in FIG. 7. Preferably, the diameter of the passageway 36 is substantially constant. A radially inwardly extending protrusion 38 in the tubular portion 31 is disposed between the first and second ends 32 and 33 to provide a reduced diameter portion of the passageway 36. An outer surface 39 of the outer housing 16 tapers inwardly at the first end 32 of the outer housing 16 to form a tapered portion 40. Preferably, the outer housing 16 is unitarily formed as a single piece and is made of an electrically conductive metal, such as aluminum.

The inner housing 17 is substantially tubular and has an outer surface 44 and an inner surface 45, as shown in FIGS. 1-3, 6 and 7. A conductor passage 41 extends from a first end 42 to a second end 43. Preferably, the inner housing 17 is unitarily formed as a single piece and is made of metal, such as steel or aluminum.

Figure 8:
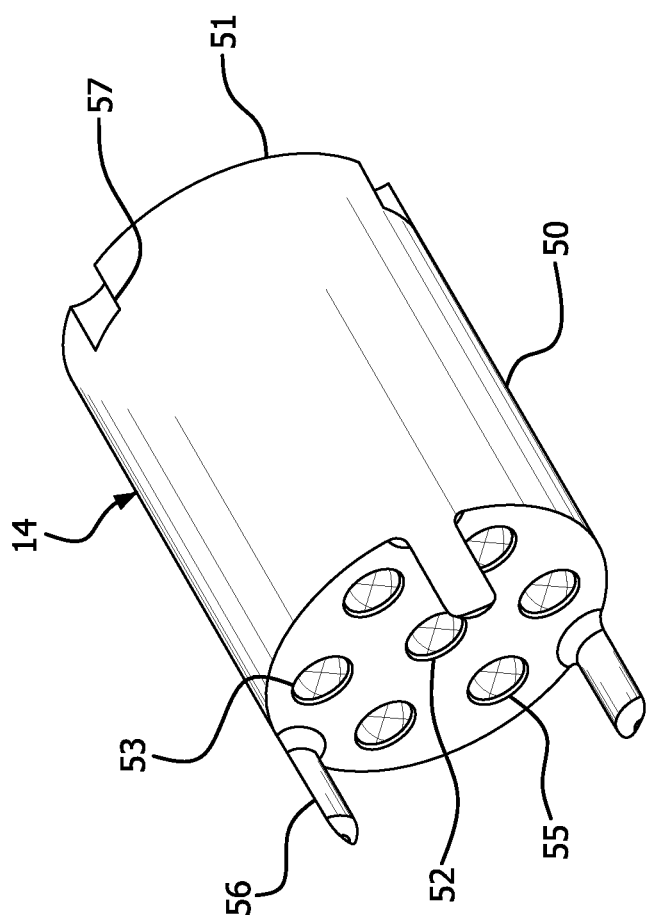
FIG. 8 is an enlarged perspective view of the connector member of FIG. 2.
Figure 9:
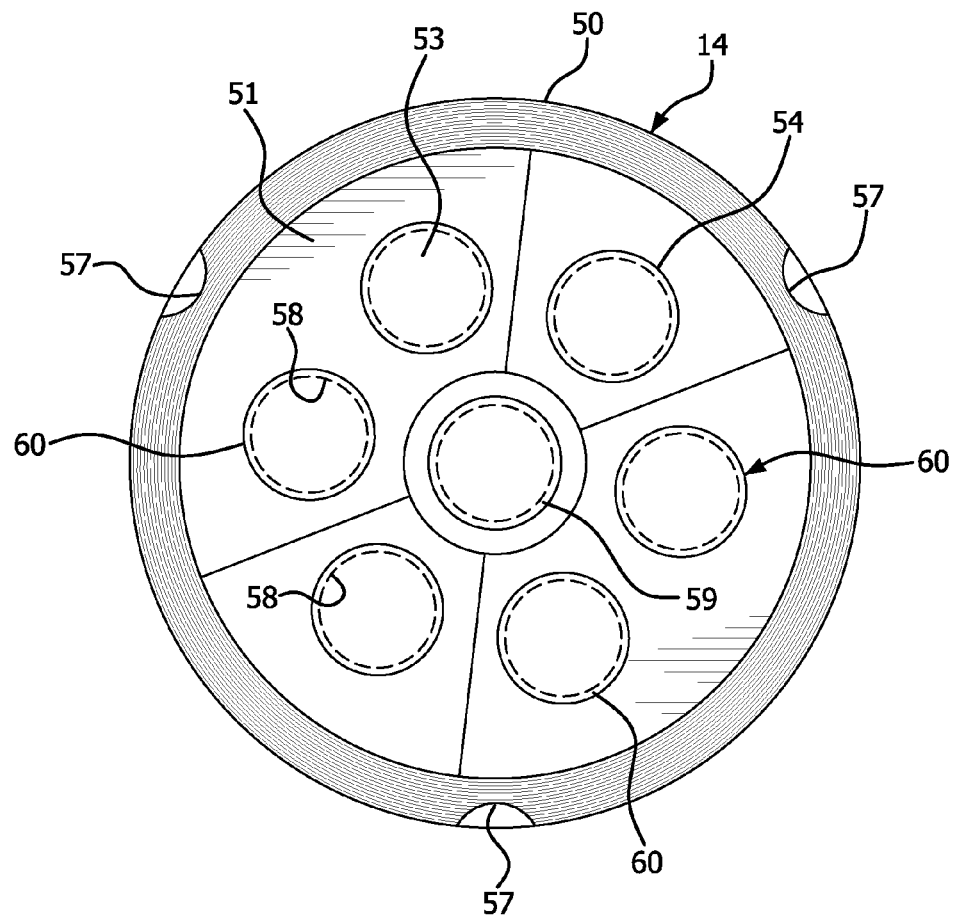
FIG. 9 is an enlarged front elevational view of the connector member of FIG. 8.

The coupling member 14 is a substantially cylindrical body 50 having a first end 51 and a second end 52, as shown in FIGS. 8 and 9. At least one through hole 53 extends from a first opening 54 at the first end 51 to a second opening 55 at the second end 52 of the body 50 to receive a wire strand 21 of the stranded conductor 12. The through holes 53 preferably are flared outwardly at the first and second openings 54 and 55 to substantially prevent excessive right angle fracture on the received wire strands 21. Knurls 58 are preferably disposed along the entire length and diameter of the through hole to facilitate gripping the received composite core wire strand 21.

Figure 6:
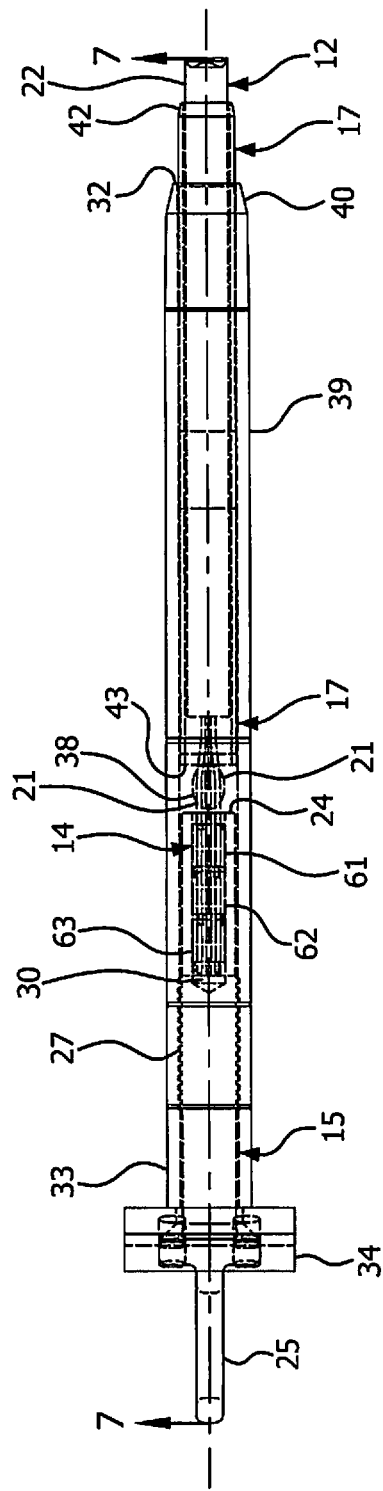
FIG. 6 is a top plan view of the connector assembly of FIG. 1 with internal structure shown in phantom lines.

At least one protrusion 56 extends axially outwardly from the second end 52 of the body 50. At least one recess 57 extends axially inwardly from the first end 51 of the body 50. As shown in FIG. 8, the protrusions 56 and recesses 57 are preferably axially and circumferentially offset. The recess 57 is adapted to receive the protrusion 56 of an adjacent coupling member, as shown in FIGS. 3, 6 and 7. The protrusion 56 preferably is longer than the recess 57 such that when the recess of a first coupling member receives the protrusion of an adjacent second coupling member, the first end 51 of the first coupling member is axially spaced from the second end 52 of the second coupling member, as shown in FIG. 6. There are preferably three protrusions 56 and three recesses 57 equally circumferentially spaced apart at the respective ends 51 and 52 of the coupling member 14. Preferably, the coupling member 14 is made of metal, such as steel or aluminum.

Figure 10:
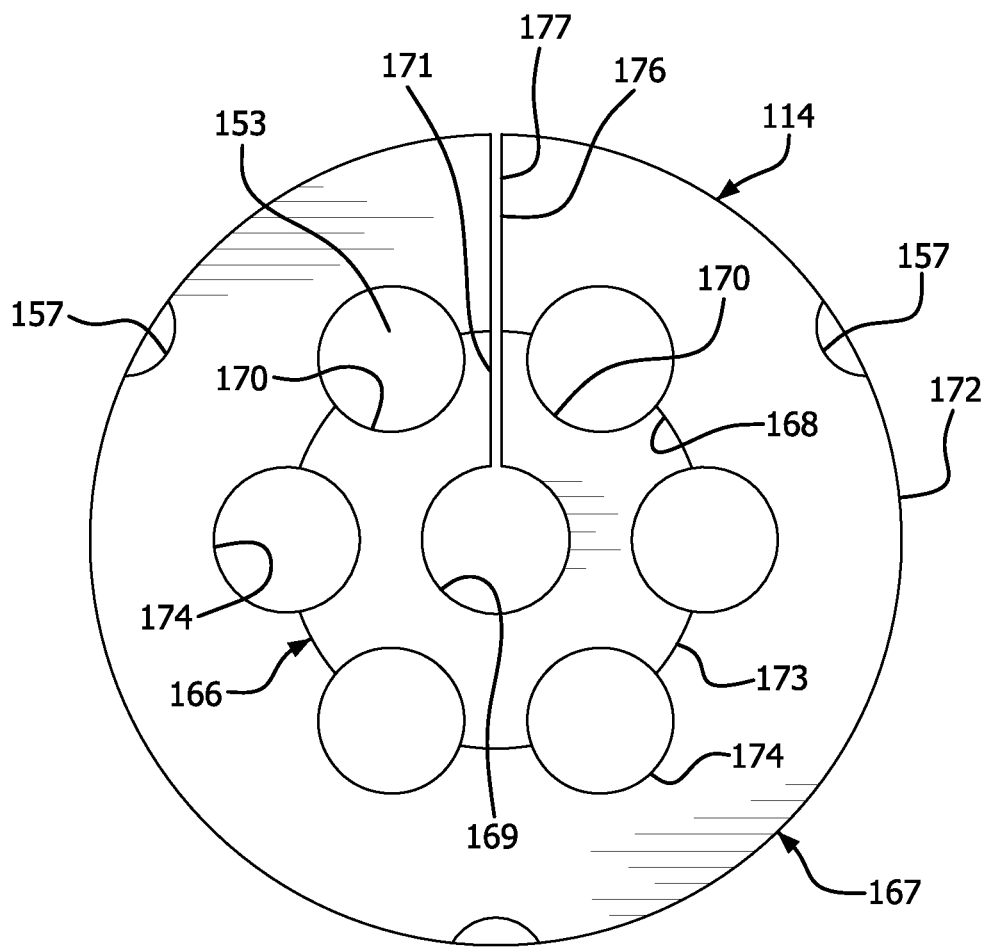
FIG. 10 is an enlarged front elevational view of a connector member in accordance with a second exemplary embodiment of the present invention.

As shown in FIGS. 8 and 9, the coupling member 14 has seven through holes 53, although any suitable number of through holes can be used. The coupling member 14 has seven through holes 53 to receive the seven wire strands 21 of a multiple strand composite core conductor 12 (FIG. 3). The through-holes 53 can be substantially parallel internally to one another or beginning at respective end 51, spaced at increasing distances internally from one another and at a fixed degree arc until emerging at end 52, thereby increasing the spacing internally to account for reduction in bending stress at an entry point at end 51. A center through hole 59 is surrounded by six outer through holes 60, as shown in FIGS. 8 and 9. The outer through holes 60 are evenly spaced or at a specific angled arc from one another and from the center through hole 59. As shown in FIG. 10, a longitudinal gap can extend from an outer surface of the coupling member 14 to the center through hole 59 to facilitate obtaining a larger compressive force at the center through hole by providing additional collapsible area for the coupling member when compressed.

Assembly and Operation

As assembled compression connector assembly 1 terminating a multiple stranded composite core conductor 12 is shown in FIGS. 1 and 4-7. The inner housing 17 is slid over the outer core 22 of the conductor 12 and the conductor is pulled through the passageway 36 in the outer housing 16. The protrusion 38 limits movement of the inner housing 17 through the passageway 36. The conductor 12 is pulled out through the opening 65 in the mounting member 34. Each individual carbon pultruded composite core strand 21 is then inserted longitudinally through a through hole 53 in the coupling member 14. Preferably, each separate strand 21 is fed into and through a separate through hole 53 in the coupling member 14. Thus, coupling member substantially prevents failure of the conductor 12 when a strand 21 is damaged.

To obtain desired tensile requirements, a plurality of coupling members 14 can be stacked together. The strand 21 is passed through the through hole 53 in a first coupling member 61 and then through an aligned through hole in a second coupling member 62. As shown in FIGS. 2, 3, 6 and 7, a third coupling member 63 can be used. Each of the coupling members 61, 62 and 63 can be substantially identical. Any suitable number of coupling members 14 can be used to obtain the necessary tensile requirement. The protrusions 56 of the first coupling member 61 are received by corresponding recesses 57 in the second coupling member 62 to facilitate aligning the through holes 53. The coupling members 14 can be crimped to secure the strands 21 within the coupling members 14.

The coupling members 14 are then inserted in the cavity 30 of the connector member 15. The coupling members 14 are moved toward the second end 26 of the connector member 15 until the third coupling member 63 abuts an end of the cavity 30, as shown in FIGS. 6 and 7. A sealing member 64 is disposed on the tubular portion 28 of the connector member 15 such that the sealing member abuts the eyelet 25. The connector member 15 is then inserted through the opening 65 in the mounting member 34 of the outer housing 16 until the first end 24 is prevented from further inward movement by the eyelet 25 abutting the mounting member 34, as shown in FIG. 7. The sealing member 64 seals the opening 65 in the mounting member 34 of the outer housing 16 to prevent the ingress of water, dirt or other contaminants. The connector member 15 and coupling members 14 can be crimped to secure the coupling members 14 in the connector member 15.

The assembled compression connector assembly 1 is then compressed in any suitable manner, such as by hydraulic, implosive or mechanical force, to compress the outer housing 16, the connector member 15 and the coupling members 14 together. The protrusions 56 are longer than the recesses 57 such that the second end 52 of the first coupling member 61 is spaced from the first end 51 of the second coupling member 62. This provides additional spacing for the extruded material during compression to substantially prevent exerting undue or excessive pressure on the strands 21. Additionally, the first and second openings 54 and 55 of the through holes 53 flare outwardly to prevent excessive compression at right angle pressure points onto the strands 21. The through holes 53 of the coupling members 14 are preferably geometrically spaced such that the through holes collapse under external compression applied equally onto the exterior of the coupling member 14 and equally onto each composite core strand 21 within the through holes from 360° and throughout the entire length of each through hole. The knurls 58 further facilitate applying the compressive force to the strands 21 when compressing the assembly 1.

Second Exemplary Embodiment

Figure 11:
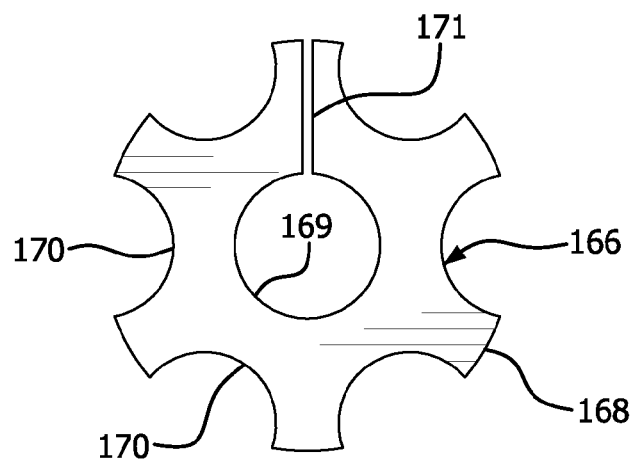
FIG. 11 is a front elevational view of an inner body of the connector member of FIG. 10.
Figure 12:
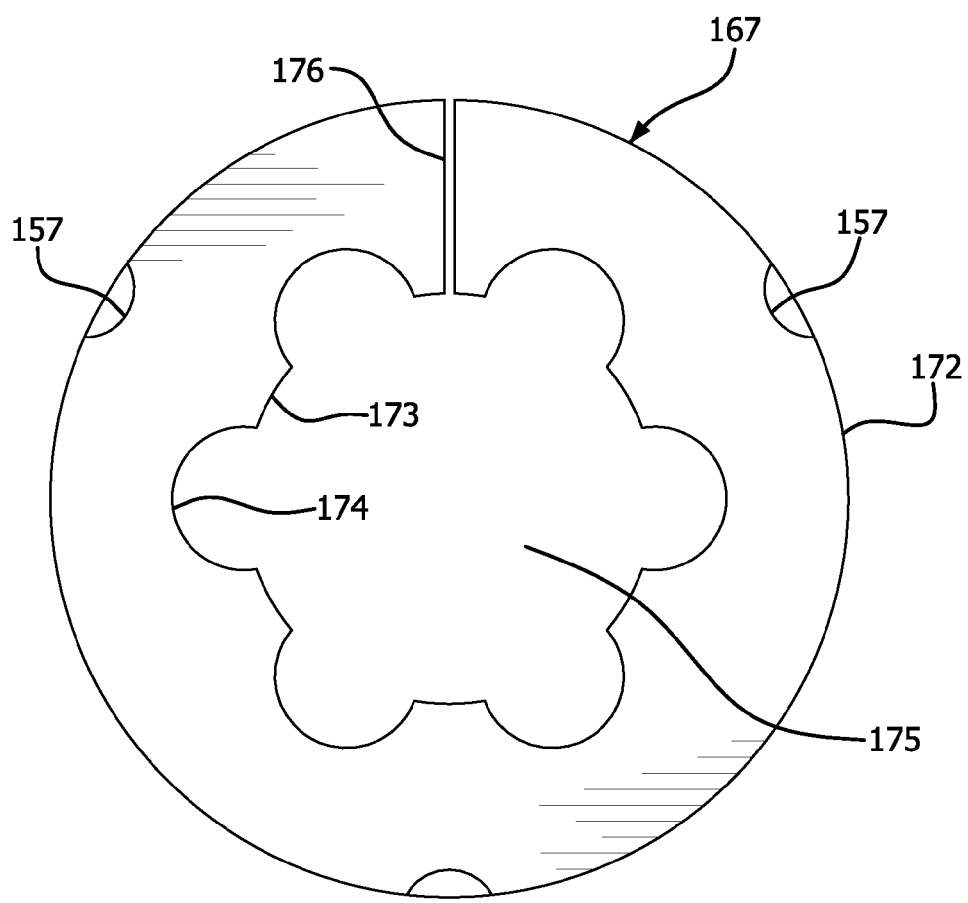
FIG. 12 is a front elevational view of an outer body of the connector member of FIG. 10.

In accordance with a second exemplary embodiment of the present invention, a coupling member 114 of FIGS. 10-12 is substantially similar to the coupling member 14 of the first exemplary embodiment. Instead of being unitarily formed as a single piece like the coupling member 14 of the first exemplary embodiment, the coupling member 114 of the second exemplary embodiment includes an inner body 166 received by an outer body 167. As shown in FIG. 11, the inner body 166 includes an outer surface 168 and a center through hole 169. A plurality of troughs 170 are formed in the outer surface 169. A longitudinal gap 171 extends from the outer surface 168 to the center through hole 169.

The outer body 167 has an outer surface 172 and a bore 175 extending axially therethrough. The bore 175 has an inner surface 173, as shown in FIG. 12. A plurality of troughs 174 are formed in the inner surface 173. A longitudinal gap 176 extends from the outer surface 172 to the inner surface 173. The plurality of recesses 157 and protrusions (not shown) are substantially similar to those of the coupling member 14 of the first exemplary embodiment.

The inner body 166 is inserted in the bore 175 of the outer body 167, as shown in FIG. 10 such that the troughs 170 of the inner body 166 are radially aligned with the troughs 174 of the outer body 167 to form the plurality of outer through holes 153. The longitudinal gaps 171 and 176 of the inner and outer bodies 166 and 167 are aligned to form a longitudinal gap 177 extending from the outer surface 172 of the outer body to the center through hole 169. Although not shown, the coupling member 14 of the first exemplary embodiment can have a similar longitudinal gap extending from an outer surface to the center through hole. The longitudinal gap provides additional collapsible area in the coupling member at the center through hole when compressing the coupling member.

The foregoing embodiments and advantages are merely exemplary and are not to be construed as limiting the scope of the present invention. The description of the exemplary embodiments of the present invention is intended to be illustrative, and not to limit the scope of the present invention. Various modifications, alternatives and variations will be apparent to those of ordinary skill in the art, and are intended to fall within the scope of the invention as defined in the appended claims and their equivalents.

What is claimed is:

1. A coupling system for receiving wire strands of a stranded composite core conductor, comprising:
a first coupling member including
a substantially cylindrical body having first and second ends;
a plurality of through holes extending through said body from respective first openings at said first end thereof to respective second openings at said second end thereof for receiving respective wire strands of the conductor;
a plurality of first protrusions extending axially outwardly from said first end of said body; and
a plurality of first recesses in said second end of said body and configured to receive respective protrusions of an adjacent second coupling member, and where the axial length of said protrusions is larger than a length of said recesses to space said second coupling member from said first coupling member.

2. The coupling system according to claim 1, wherein each of said through holes is knurled along its length.

3. The coupling system according to claim 1, wherein each of said through holes is tapered at said first and second openings.

4. The coupling system according to claim 1, wherein said protrusions and said recesses are circumferentially offset.

5. The coupling system according to claim 1, wherein said through holes include a central through hole surrounded by a plurality of outer through holes.

6. The coupling system according to claim 5, wherein a longitudinal gap extends from an outer surface of said first coupling member to said central through hole along the entire length of said first coupling member.

7. The coupling system according to claim 1, wherein said first coupling member includes
an inner body having a first end, a second end, an outer surface and a plurality of inner troughs extending from said first end to said second end thereof; and
an outer body configured to receive said inner body and having a first end, a second end, an inner surface and a plurality of outer troughs extending from said first end to said second end thereof, said inner troughs and said outer troughs being radially aligned to form a plurality of said through holes when said outer body receives said inner body.

8. The coupling system according to claim 7, wherein said inner body has a central through hole extending from said first end to said second end.

9. The coupling system according to claim 8, wherein a longitudinal gap extends from an outer surface of said outer body to said central through hole along the entire lengths of said inner and outer bodies.

10. The coupling system according to claim 1, wherein the second coupling member includes
a substantially cylindrical body having first and second ends;
a plurality of through holes extending through said body from respective first openings at said first end thereof to respective second openings at said second end thereof for receiving respective wire strands of the conductor;
a plurality of second protrusions extending axially outwardly from said first end of said body; and
a plurality of second recesses in said second end of said body and configured to receive respective protrusions of an adjacent like coupling member,
said second coupling member and said first coupling member abutting one another through said first protrusions received in said second recesses.

11. A compression connector assembly for terminating wire strands of a stranded composite core conductor, comprising:
a first coupling member having a plurality of through holes extending from a first end to a second end thereof for receiving respective wire strands of the conductor, a plurality of first protrusions extending axially outwardly from said first end and a plurality of first recesses in said second end configured to receive respective protrusions of an adjacent second coupling member, said first protrusion being configured to space said first coupling member from said second coupling member;
a connector member having a cavity at a first end thereof receiving said first coupling member; and
an outer housing having a passageway extending from a first end to a second end thereof and receiving said connector member.

12. The compression connector assembly according to claim 11, further comprising an inner housing having a passageway extending from a first end to a second end thereof and receiving the conductor, said inner housing being received in said outer housing passageway adjacent said connector member.

13. The compression connector assembly according to claim 11, wherein an axial length of said protrusions is longer than an axial length of said recesses.

14. The compression connector assembly according to claim 11, wherein said through holes include a central through hole surrounded by a plurality of outer through holes.

15. The compression connector assembly according to claim 14, wherein a longitudinal gap extends from an outer surface of said first coupling member to said central through hole along the entire length of said first coupling member.

16. The compression connector assembly according to claim 11, wherein said first coupling member includes
an inner body having a first end, a second end, an outer surface and a plurality of inner troughs extending from said first end to said second end thereof; and
an outer body configured to receive said inner body and having a first end, a second end, an inner surface and a plurality of outer troughs extending from said first end to said second end thereof, said inner troughs and said outer troughs being radially aligned to form a plurality of through holes when said outer body receives said inner body.

17. The compression connector assembly according to claim 16, wherein said inner body of said coupling member has a central through hole extending from said first end to said second end.

18. The compression connector assembly according to claim 17, wherein a longitudinal gap extends from an outer surface of said outer body to said central through hole along the entire lengths of said inner and outer bodies.

19. The compression connector assembly according to claim 11, wherein the second coupling member includes
a plurality of through holes extending from a first end to a second end thereof for receiving respective wire strands of the conductor;
a plurality of second protrusions extending axially outwardly from said first end thereof; and a plurality of second recesses in said second end thereof configured to receive a respective plurality of protrusions of an adjacent like coupling member, said second coupling member and said first coupling member abutting one another through said first protrusions received in said second recesses.

20. A method of terminating a stranded composite core conductor, comprising the steps of passing each strand of the stranded composite core conductor through a separate series of aligned through holes in a plurality of serially adjacent coupling members, each coupling member having axially facing opposite end faces;

inserting the coupling members in a cavity in a connecting member;

inserting the connecting members in an outer housing whereby said coupling members are spaced apart; and compressing at least one of the coupling members, the connecting member and the outer housing to secure the received strands therein while maintaining the adjacent end faces of separate coupling members axially spaced from one another.

21. The method of terminating a stranded composite core conductor according to claim 20, wherein the axial spacing of adjacent end faces is maintained by a plurality of protrusions on a first end face of one coupling member abutting respective recesses in a second end face of each adjacent coupling member.

* * * * *